United States Patent [19]
Lin et al.

[11] Patent Number: 5,589,850
[45] Date of Patent: Dec. 31, 1996

[54] APPARATUS FOR CONVERTING TWO DIMENSIONAL PIXEL IMAGE INTO ONE-DIMENSIONAL PIXEL ARRAY

[75] Inventors: Lie-Der Lin, Taipei Hsien; Jiunn-Ming Ju, Tainan Hsien, both of Taiwan

[73] Assignee: Industrial Technology Research Institute, Hsinchu Hsien, Taiwan

[21] Appl. No.: 313,524

[22] Filed: Sep. 26, 1994

[51] Int. Cl.$^6$ .................................................. G09G 5/36
[52] U.S. Cl. ........................ 345/132; 345/133; 345/138; 345/112; 348/584
[58] Field of Search ............................ 382/41, 293, 235; 315/10; 345/132, 133, 138, 112, 121; 348/584; 340/793; 358/108, 107, 432; 359/9, 21; 364/900; 101/109; G06F 3/14

[56] References Cited

U.S. PATENT DOCUMENTS

| | | | |
|---|---|---|---|
| 4,492,161 | 7/1985 | Johnson et al. | 101/109 |
| 4,536,801 | 8/1985 | Torkelson et al. | 358/432 |
| 4,841,292 | 6/1989 | Zeno | 345/121 |
| 5,117,296 | 5/1992 | Hoebing | 359/21 |
| 5,119,442 | 6/1992 | Brown | 382/41 |
| 5,173,948 | 12/1992 | Blackham et al. | 382/293 |

OTHER PUBLICATIONS

Windows Magazine and Windows Upgrades, "Upgrade Your Video Card" Summer 1993, vol. 1 No. 1 by Ken Milburn.

Primary Examiner—Raymond J. Bayerl
Assistant Examiner—Kuniki C. Lockett
Attorney, Agent, or Firm—W. Wayne Liauh

[57] ABSTRACT

An converter apparatus to convert the (X, Y) coordinate of the two-dimensional screen position of a pixel to a linear address. The converter apparatus, which can be used with a variety of video displays of various resolutions including 1280×1024, 1152×900, 640×480, 1024×768, 1600×1280, and 800×600, contains three circuits in parallel disposition to receive and process various portions of the X and Y bits, and to output a Z-bit linear address. The first circuit mainly contains a multiplexer and it receives lower X bits as inputs; the second circuit contains a plurality of adders and multiplexers and a logical operation circuit, and it receives higher X bits and lower Y bits as inputs; and the third circuit mainly contains a multiplexer and it receives higher Y bits and at least a portion of the lower Y bits as inputs. The converter apparatus does not require a system CPU thus very high speed conversion can be achieved.

10 Claims, 7 Drawing Sheets

APPARATUS FOR CONVERTING TWO DIMENSIONAL PIXEL IMAGE INTO ONE-DIMENSIONAL PIXEL ARRAY

FIELD OF THE INVENTION

This invention relates to an apparatus for use with a computer monitor to convert two-dimensional pixel images into one-dimensional pixel arrays. More particularly, this invention relates to a high-speed stand-alone apparatus to convert the 2-D coordinates of the pixels of a video image into linear addresses to allow for a more efficient usage of memory space. The apparatus disclosed in the present invention can be used for a wide range of video displays with a variety of graphic resolutions and is particularly advantageous for video displays having a resolution of at least 640 pixels in the horizontal direction.

BACKGROUND OF THE INVENTION

A computer screen is composed of tens or hundreds of thousands or even millions of tiny dots. The smallest element on a video display is called a pixel, which comprises one or more dots that are treated as a unit. A pixel can be one dot on a monochrome screen, or three dots (red, green, and blue, or RGB) on color screens, or clusters of these dots. The number of bits assigned to each pixel in its associated digital memory determines the number of gray scales (or shades) and colors (including chrominance and lumance) that can be represented. A monochrome, in which one bit per pixel is all that is required (on or off), is the most economic system. A color display, on the other hand, can use up to four bytes for each of the red, green, and blue dots to display millions or even billions of different shades. Most of the color displays that are most widely used today belong to the so-called high-resolution displays, for which many megabytes of memory would have to be reserved to hold a graphic image.

Conventionally, a two-dimensional addressing is used to relate the pixel position in the screen to its corresponding address in the display memory (or video memory). This provides a convenient and exact correspondence between the pixel position in the video display and the memory address in the display memory. For example, a screen position at (X, Y) (i.e., Xth pixel position in the Yth scan line, counting from left to right and from top to bottom) has an identical memory address of (X, Y) in the video memory. Because commercial memory chips are provided in the units of $2^n$, the conventional two-dimensional pixel image addressing system can result in substantial inefficiency in the video memory. For example, with a 512×512=256K memory chip, a video display with a resolution of 1152×900 will require 6 (1536/512×1024/512) memory chips. The memory usage efficiency is therefore (1152×900)/(1536×1024)=65.9%.

In order to improve the memory usage efficiency, a linear addressing system can be provided to store the pixel positions of a screen image. With a linear addressing, the positions of the two-dimensional screen pixels are stored in a sequential and continuous manner. A linear addressing can substantially improve the memory usage efficiency and thus reduce the number of memory chips required to store video images. Using the previous case as an example, with a video display having a resolution of 1152×900, the number of memory chips required is (1024/512)×(1024/512)=4. The memory usage efficiency is thus calculated to be (1152×900)/(1024×1024)=98.9%.

Comparing the above two examples, the memory usage efficiency is 98.9% for a linear addressing versus 65.9% for a two-dimensional addressing. Thus, significant savings in the memory chips can be realized using a linear addressing system.

Using the previous video display, which has a resolution of 1152×900, as an example, a pixel with a screen position of (X, Y) corresponds to a linear address of:

Linear address=1152×Y+X Although linear memory addressing increases the memory usage efficiency, it requires additional hardware and/or software effort to calculate the linear address from a two-dimensional input data. Conventional 2-D-to-linear converters require data processing by the central processing unit (CPU) of the system. This not only subjects the video display to the clock rate of the system CPU, it could also slow down the overall performance of the system. To faciliate the high processing speed and ease of operation, it therefore is desirable to provide a device which can perform the required conversions independent of the CPU, allow a high-speed conversion, and require very simple construction with a minimum hardware implementation including a minimum number of gates so as to minimize the production cost. Furthermore, it is desirable that the device so developed can be flexibly used for a wide range of video display screens of various resolutions.

SUMMARY OF THE INVENTION

The primary object of the present invention is to provide an apparatus for converting two-dimentioned pixel images into a linear pixel array to improve the memory usage efficiency. More particularly, the primary object of the present invention is to provide an apparatus to convert a two-dimensional coordinate (X, Y), which describes the position of a screen pixel, into a linear coordinate (Z).

Using a video display having a resolution of 1280 scan-lines in the y-direction and 1600 pixels in the x-direction, the apparatus of the present invention can be considered as a device that converts a two-dimensional pixel coordinate (X, Y) into a linear coordinate Z according to the following formula:

$$\text{Linear address } Z = 1280 \times Y + X$$

The apparatus disclosed in the present invention can be used for all the video displays currently available in the market, including: 1600×1280, 1280×1024, 1152×900, 1024×768, 800×600, 640×480, etc.

One of the advantages of the present invention is that it requires a minimum gate count and operates independent of the system CPU. This advantage allows fast conversion to be achieved using a minimum of hardware implementation.

BRIEF DESCRIPTION OF THE DRAWINGS

The present invention will be described in detail with reference to the drawings showing the preferred embodiments of the present invention, wherein.

DETAILED DESCRIPTION OF THE PREFERRED EMBODIMENT

Figure 1:
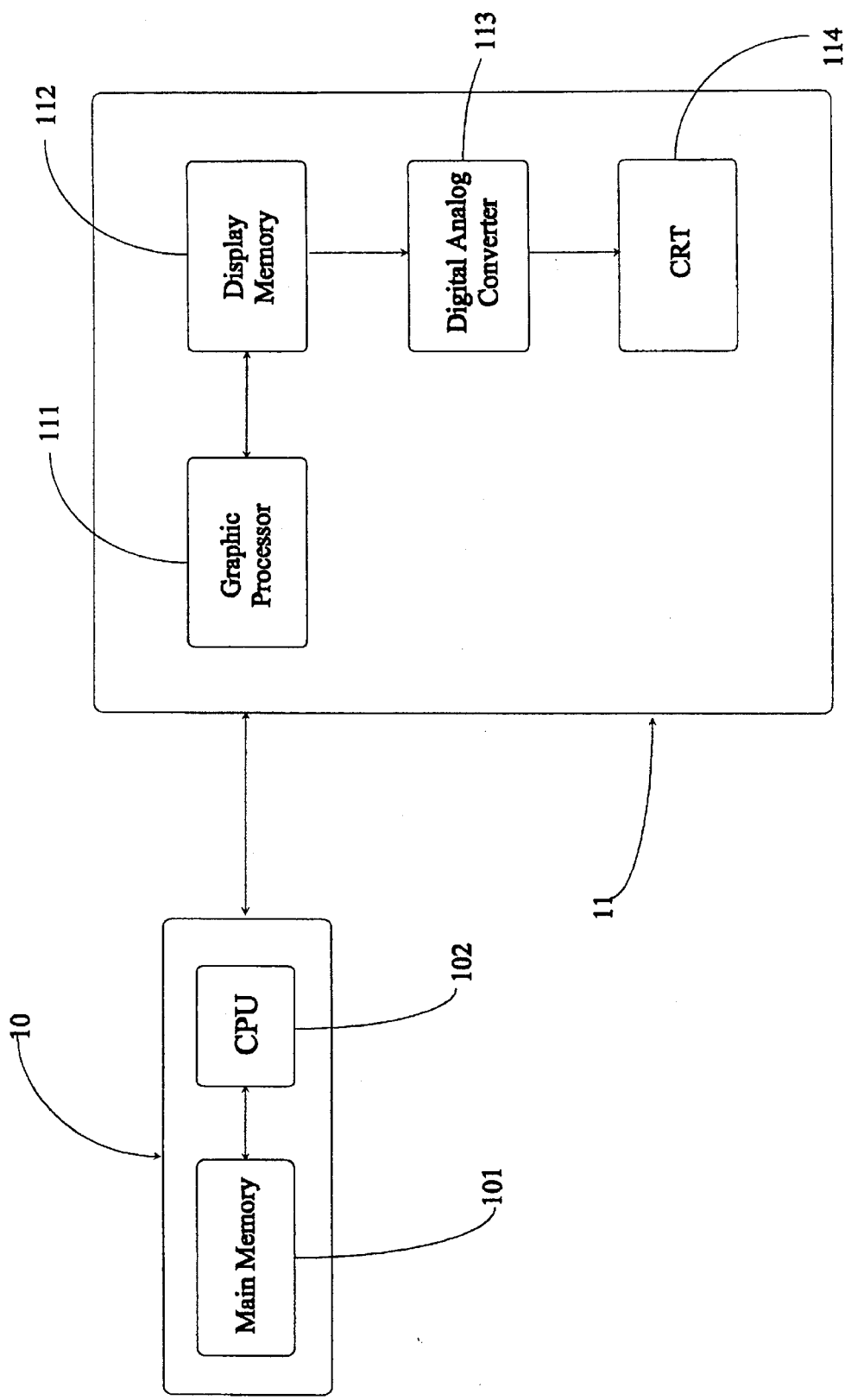
FIG. 1 is a block diagram illustrating a graphic control system utilizing a graphic processor, a display memory, and a digital/analog converter to display a graphic image from a CPU to a CRT.
Figure 2:
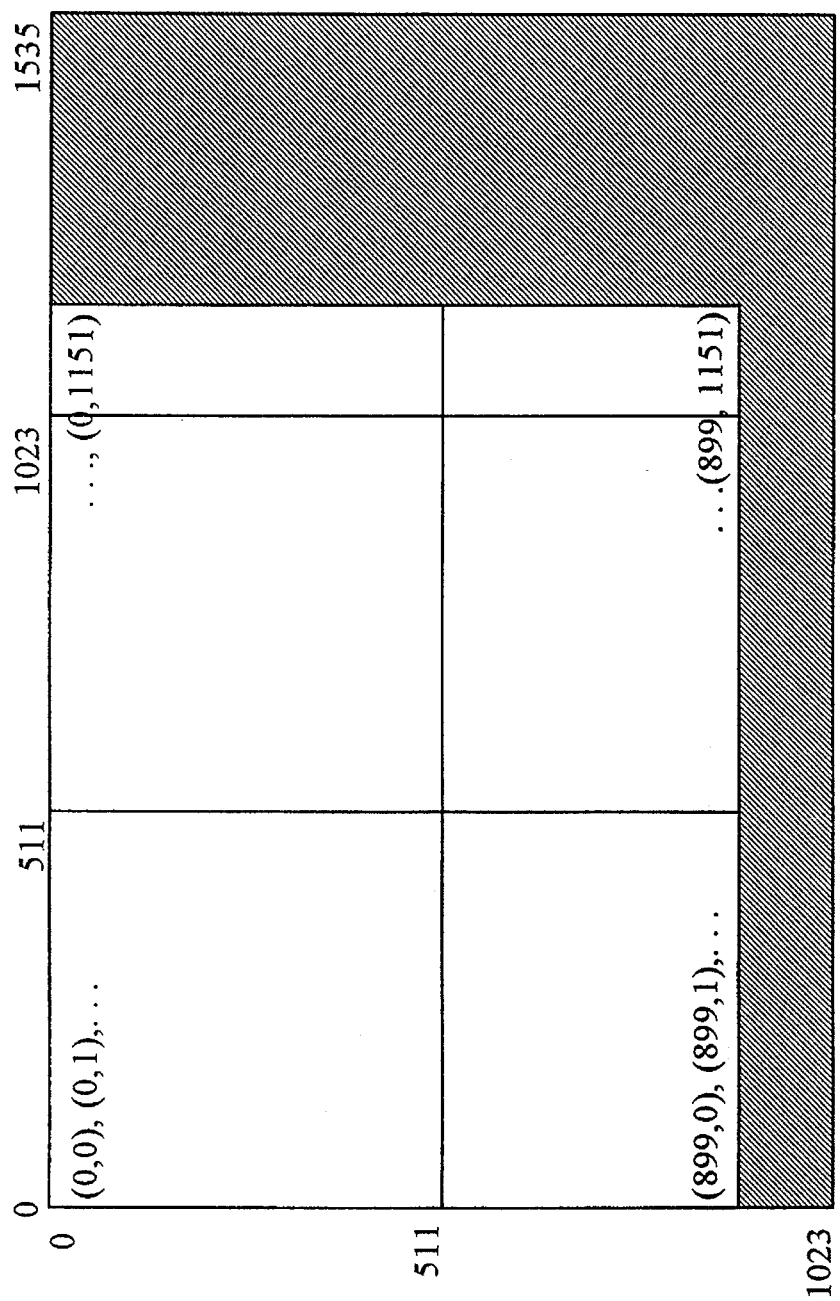
FIG. 2 is a schematic diagram illustrating a two-dimensional addressing system for describing a two-dimensional pixel in VRAM (video random access memory).
Figure 3:
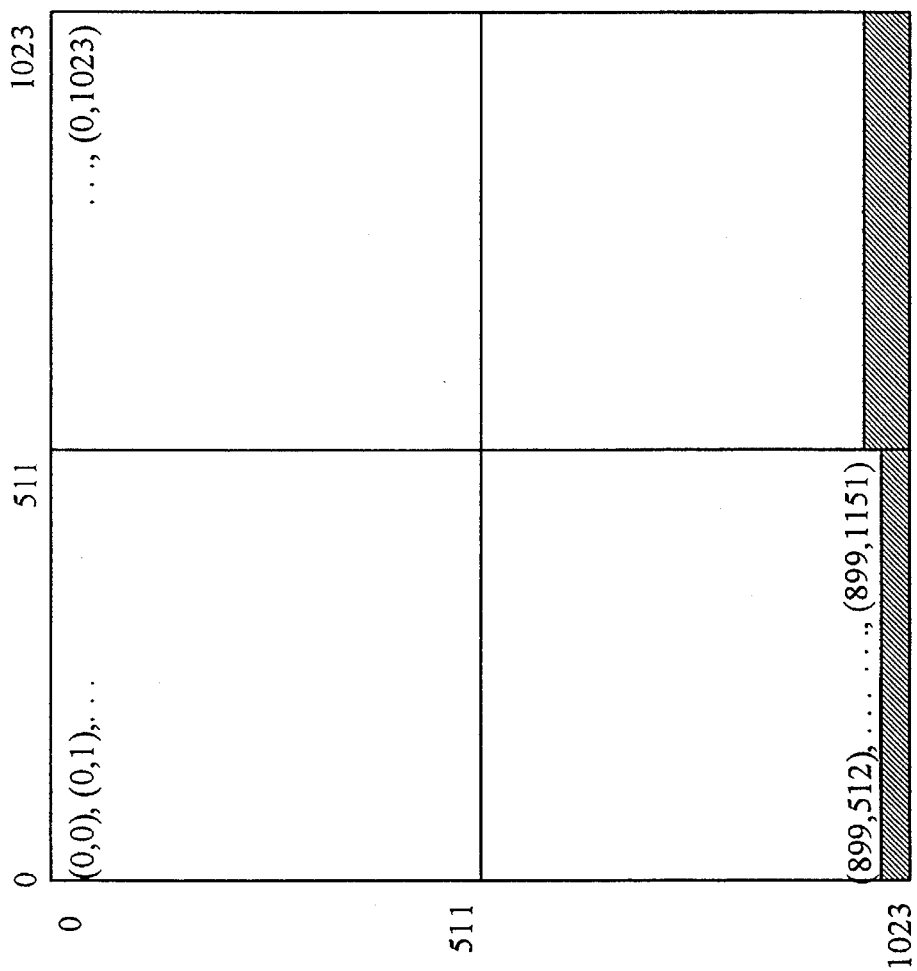
FIG. 3 is a schematic diagram illustrating a linear addressing system for describing a two-dimensional pixel in VRAM.

Referring to the drawings, FIG. 1 is a block diagram illustrating a graphic control system 11 connected to a host computer 10. The host computer 10 comprises a CPU 102 and main memory 101. The graphic control system 11 utilizes a graphic processor 111, a display memory 112, and a digital/analog converter 113, to display a graphic image from a CPU 102 to a CRT, or any other appropriate display device 114. FIG. 2 is a schematic diagram illustrating a two-dimensional addressing system in VRAM (video random access memory) in conjunction with a 1600×1024 video display. And FIG. 3 is a schematic diagram illustrating a linear addressing system in VRAM in conjunction with the same video display. The shaded areas in FIGS. 2 and 3 are the so-called "off-screen areas", which are memory spaces that must be reserved but are not used. A comparison of the shaded areas in FIGS. 2 and 3 shows that a much more efficient memory usage can be realized with a linear addressing system.

Figure 4:
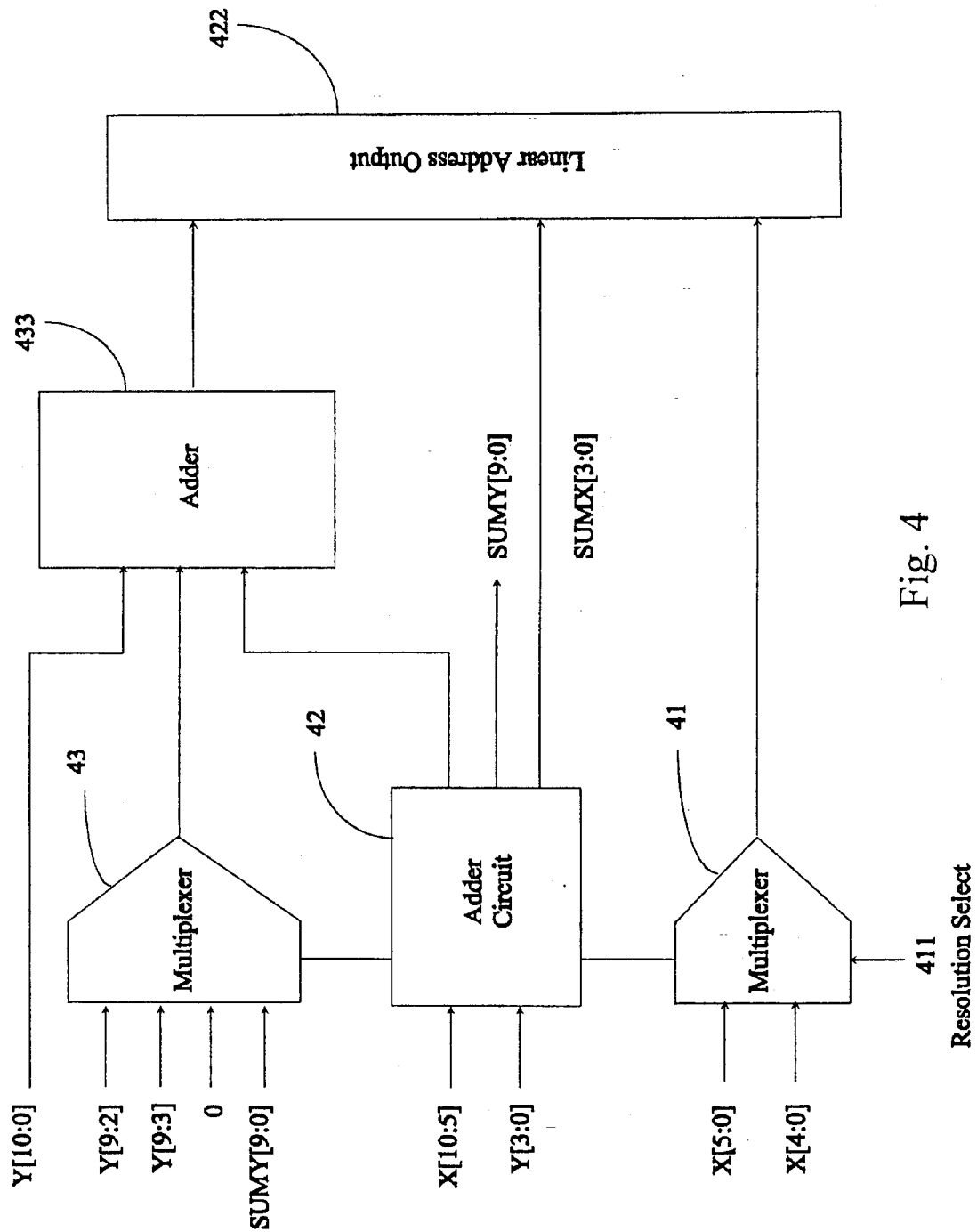
FIG. 4 is a block diagram illustrating a preferred embodiment of the apparatus disclosed in the present invention.

FIG. 4 is a block chart diagram illustrating a preferred embodiment of the apparatus disclosed in the present invention. The apparatus shown in FIG. 4 can be used for essentially all the currently commercially available video displays including the following resolutions: 1600×1280, 1280×1024, 1152×900, 1024×768, 800×600, and 640×480. The main function of the apparatus as shown in FIG. 4 is to convert the two-dimensional coordinate of a pixel in a screen (X, Y) into a linear address Z. With the resolutions mentioned above, X can be a 10-bit (i.e., X[9:0], or X0, X1, ..., X9), or 11-bit (i.e., X[10:0], or X0, X1, ..., X10) address or binary number. Likewise, Y also can be a 10-bit (i.e., Y[9:0], or Y0, Y1, ..., Y9), or 11-bit (i.e., Y[10:0], or Y0, Y1, ..., Y10) address. The output 433 of the conversion, Z, is a maximum 21-bit address (i.e., Z[20:0], i.e., Z0, Z1, ..., Z20).

FIG. 4 illustrates a parallel processing approach utilized in the present invention to perform the two-dimensional-to-linear conversion. FIG. 4 shows that the apparatus of the present invention comprises two multiplexers 41 and 43 in Section 1 and Section 3, respectively, and an adder operation circuit 42 in Section 2. Multiplexer 41 is connected to the bypass bits of X. The bypass bits of X are defined as the x-directional bits that will not participate in the adder operation with the y-directional bits. Depending on the desired resolution, the bypass bits can be either 5-bit (i.e., X[4:0], which contain the five lowest x-directional bits) or 6-bit (i.e., X[5:0], which contain the six lowest x-directional bits). A resolution select 411 allows only one of the two inputs (X[4:0] and X[5:0]) to be output from multiplexer 41. X[4:0] or X[5:0] constitutes the lowest five or six bits of the linear address Z[20:0].

The adder operation circuit 42 in Section 2 receives two inputs: Y[3:0], which are the lowest four bits of Y and X[10:5]. X[10:5] are the 6th and higher bits of X. The outputs coming from the Section adder operation circuit 42 are a four-digit binary number SUMX[3:0] and a carrier CIY. SUMX[3:0] constitute the next four bits of the linear address Z[20:0]. For certain displays, such as 1600×1280 and 800×600, the Section adder operation circuit 42 also outputs SUMY[9:0]. The bit values of SUMY[9:0] require inputs of Y[10:1] or Y[10:4], and a carrier COX. This is discussed in FIG. 5.

FIG. 4 also shows multiplexer 43, which is connected to Y[9:2], Y[9:3], 0, and SUMY[9:0] as inputs. The output from multiplexer 43 consists of one of the these four inputs, and it is sent to adder 433, along with input Y[10:0]. The output bits from adder 433 constitute the rest of the bits for the linear address Z[20:0].

Figure 5:
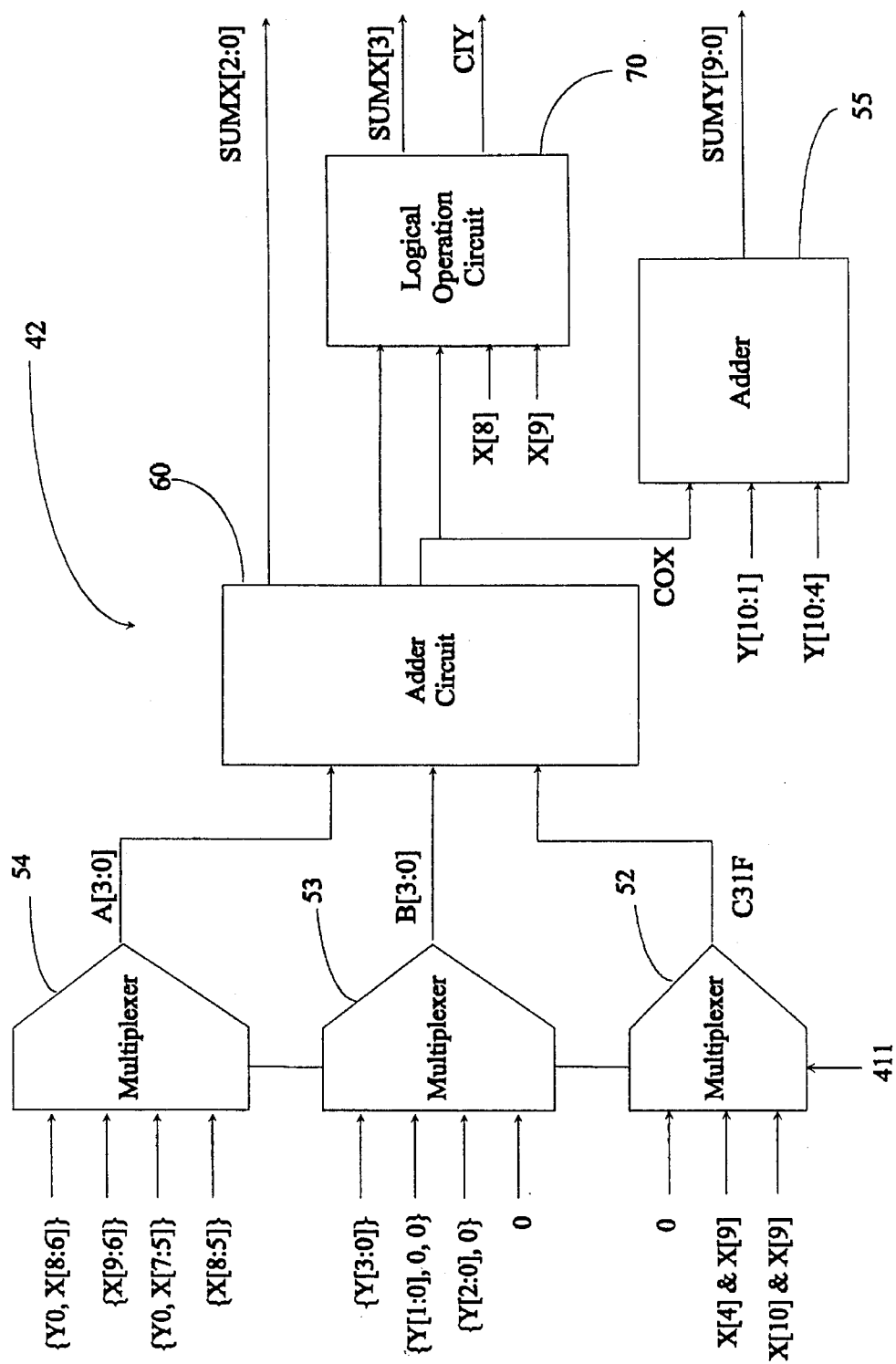
FIG. 5 is a block diagram illustrating a preferred embodiment of the Section 2 adder operation circuit as shown in FIG. 4.

FIG. 5 shows a block diagram of a preferred embodiment of the adder operation circuit 42 in Station 2. Circuit 42 comprises three multiplexers 52, 53, and 54, adder circuit 60, adder 55, and a logical operation circuit 70. Multiplexer 52 receives three inputs: 0, {X[8] & X[9]}, and {X[10] & X[9]}; multiplexer 53 receives four inputs: 0, {Y[3:0]}, {Y[1:0], 0, 0}, and {Y[2:0], 0}; and multiplexer 54 receives four inputs: {Y[0], X[8:6]}, {X[9:6]}, {Y[0], X[7:5]}, and {X[8:5]}. All the three multiplexers 52, 53, and 54 are connected to a resolution select 411. Outputs from multiplexers 54, 53, and 52 are: A[3:0], B[3:0], and a carrier signal C31F, respectively. The values of A[3:0], B[3:0], and the carrier signal C31F are input to adder circuit 60, which outputs {SUMX[2:0], SUMX3}, and carrier COX. Adder 55 is a full adder which receives inputs of Y[10:1], Y[10:4], and carrier COX, and outputs SUMY[9:0]. The logical operation circuit 70 receives SUMX3, X[8] and X[9] as inputs, and produces SUMX[3] and carrier CIY as outputs.

Figure 6:
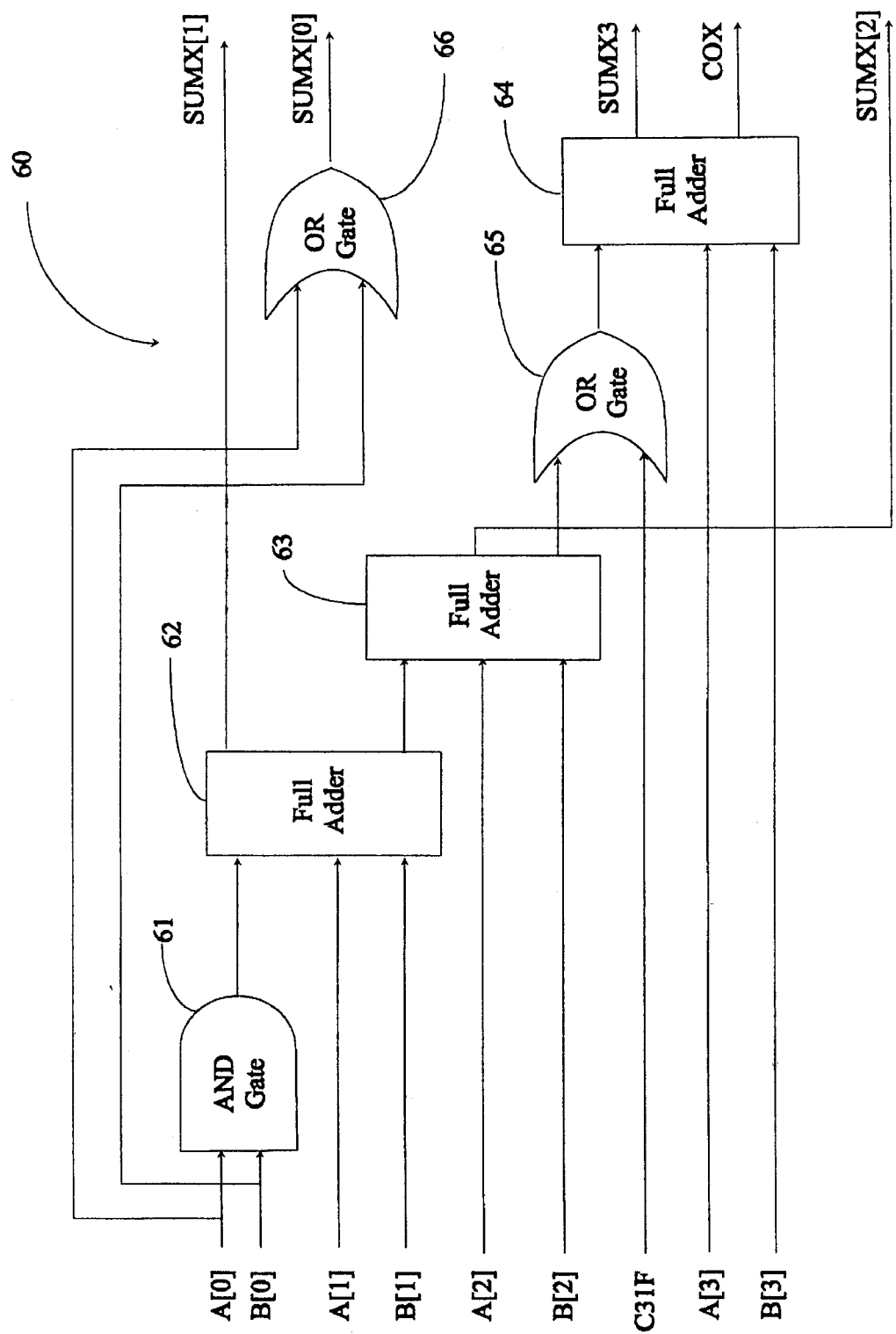
FIG. 6 is a block diagram showing a preferred circuit layout for the adder circuit as shown in FIG. 5.
Figure 7:
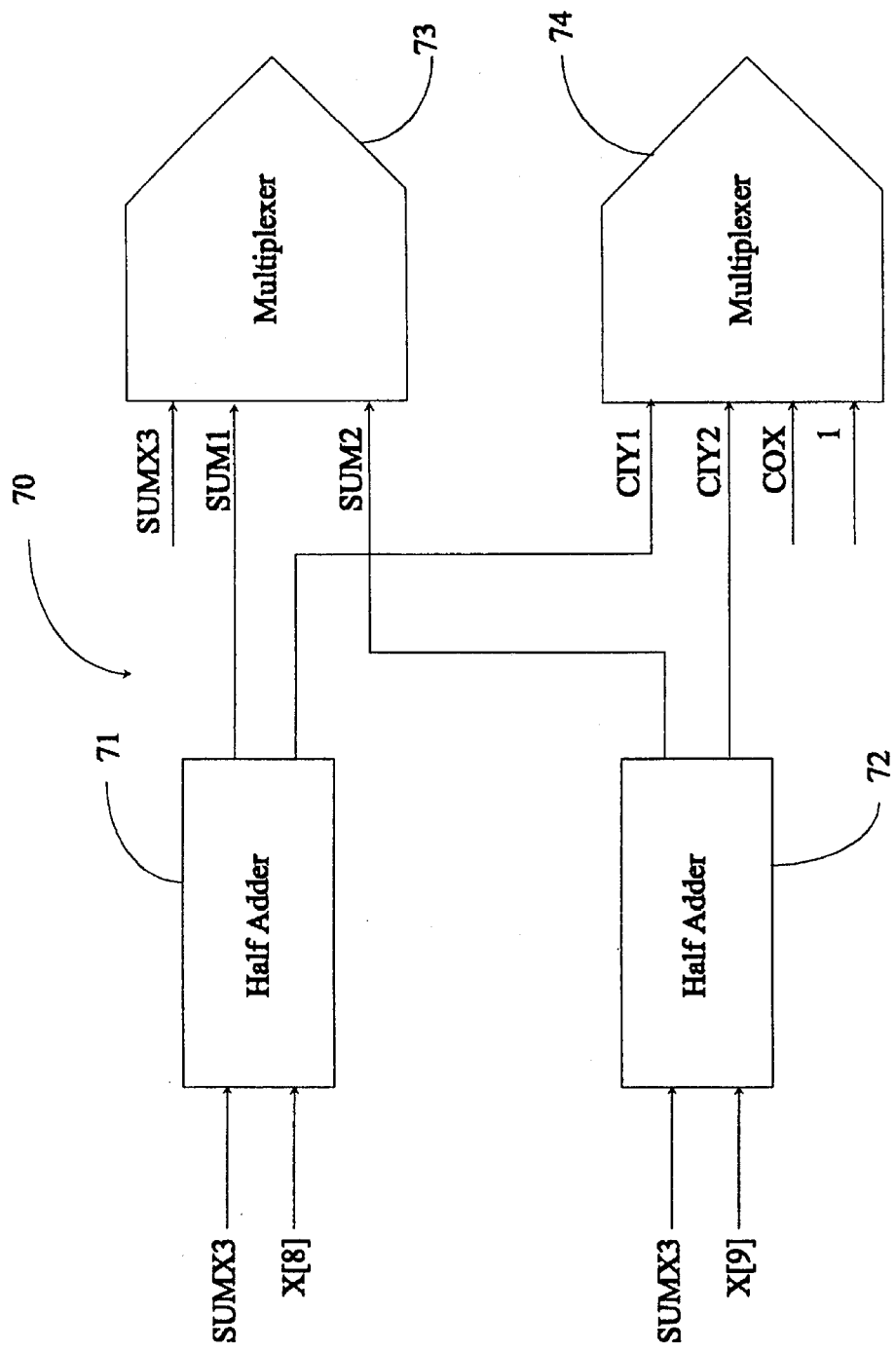
FIG. 7 is a block diagram showing a preferred circuit layout for the logical operation circuit as shown in FIG. 5.

FIG. 6 is a block diagram of a preferred embodiment of the adder circuit 60 as shown in FIG. 5. The adder circuit 60 comprises an AND gate 61, three full adders 62, 63, and 64, an OR gate 65, and an EO gate (exclusive OR gate) 66. As shown in FIG. 6, adder circuit 60 receives the values of A[3:0], B[3:0], and the carrier signal C31F as inputs and produces {SUMX[2:0], SUMX3}, and carrier COX, as outputs. FIG. 7 is a block diagram of a preferred embodiment of the logical operation circuit 70 shown in FIG. 5. The logical operation circuit 70 comprises two half adders 71 and 72, and two multiplexers 73 and 74. FIG. 7 shows that the half adder 71 receives SUMX3 and X[8] as inputs, and sends out SUM1 and carrier CIY1 as outputs; and half adder 72 receives SUMX3 and X[9] as inputs, and outputs SUM2 and carrier CIY2. FIG. 7 also shows that multiplexer 73 selects among three inputs: SUMX3, SUM1, and SUM2 to generate output SUMX[3]; and multiplexer 74 selects among three inputs CIY1, CIY2, COX, and {1} to produce a carrier output CIY.

The present invention will now be described more specifically with reference to the following example. It is to be noted that the following descriptions of example including preferred embodiment of this invention are presented herein for purpose of illustration and description; it is not intended to be exhaustive or to limit the invention to the precise form disclosed.

EXAMPLE 1 (Video Display with 1600×1280 Resolution):

The process to convert the two-dimensional coordinate (X, Y) of a pixel in a 1600×1280 screen to a linear address Z can be expressed by a binary operation as follows:

$$\begin{aligned} Z &= Y \times 1600 + X \\ &= Y \times (1024 + 512 + 64) + X \\ &= Y \times (2^{10} + 2^9 + 2^6) + X \end{aligned}$$

In the above expression, Y has a 11-bit address (i.e., Y=Y[10:0]), and X has also a 11-bit address (i.e., X-X[10:0]); Z is 21-bit (i.e., Z=Z[20:0]).

The conversion from (X, Y) to Z can be expressed in terms of the individual binary bits (or addresses) in Table 1a below:

TABLE 1a

|     |     |     |     |     |     |     |     |     |     | X10 | X9 | X8 | X7 | X6 | X5 | X4 | X3 | X2 | X1 | X0 |
|-----|-----|-----|-----|-----|-----|-----|-----|-----|-----|-----|-----|-----|-----|-----|-----|-----|-----|-----|-----|-----|
|     |     |     |     | Y10 | Y9  | Y8  | Y7  | Y6  | Y5  | Y4  | Y3 | Y2 | Y1 | Y0 |    |    |    |    |    |    |
|     | Y10 | Y9  | Y8  | Y7  | Y6  | Y5  | Y4  | Y3  | Y2  | Y1  | Y0 |    |    |    |    |    |    |    |    |    |
| Y10 | Y9  | Y8  | Y7  | Y6  | Y5  | Y4  | Y3  | Y2  | Y1  | Y0  |    |    |    |    |    |    |    |    |    |    |
| Z20 | Z19 | Z18 | Z17 | Z16 | Z15 | Z14 | Z13 | Z12 | Z11 | Z10 | Z9 | Z8 | Z7 | Z6 | Z5 | Z4 | Z3 | Z2 | Z1 | Z0 |

Table 1a can be rearranged into three sections in Table 1b by switching the second and fourth rows in Table 1a and moving the positions of X8, X7 and X6 downward by one row, to show the positions of the y-directional and x-directional input bits as described in FIGS. 5 and 6.

TABLE 1b

| Section 3 | | | | | | | | | | Section 2 | | | | | Section 1 | | | | | |
|-----|-----|-----|-----|-----|-----|-----|-----|-----|-----|-----|-----|-----|-----|-----|-----|-----|-----|-----|-----|-----|
|     |     |     |     |     |     |     |     |     |     | X10 |    |    |    |    |    |    |    |    |    |    |
| Y10 | Y9  | Y8  | Y7  | Y6  | Y5  | Y4  | Y3  | Y2  | Y1  | Y0  | X9 |    |    |    | X5 | X4 | X3 | X2 | X1 | X0 |
|     | Y10 | Y9  | Y8  | Y7  | Y6  | Y5  | Y4  | Y3  | Y2  | Y1  | Y0 | X8 | X7 | X6 |    |    |    |    |    |    |
|     |     |     |     | Y10 | Y9  | Y8  | Y7  | Y6  | Y5  | Y4  | Y3 | Y2 | Y1 | Y0 |    |    |    |    |    |    |
| Z20 | Z19 | Z18 | Z17 | Z16 | Z15 | Z14 | Z13 | Z12 | Z11 | Z10 | Z9 | Z8 | Z7 | Z6 | Z5 | Z4 | Z3 | Z2 | Z1 | Z0 |

In Table 1b, all the X and Y bits are groups into three sections, Section 1, Section 2, and Section 3. Each of these three sections is described below:

Section 1:

Section 1 contains all the X bits that will not participate in additions with the y-directional bits. These bits are called by pass bits. In this resolution, the by pass bits are X0, X1, X2, X3, X4 and X5. The sum of Section 1 equals X[5:0].

Section 2:

As it has been implicitly defined before, X[a:b] represents Xb, . . . , Xa. For example, X [8:6] represents X6, X7, X8. And Y[a:b] represents Yb, . . . , Ya. For example, Y[3:0] represents Y3, Y2, Y1, Y0. In all the bit arrays, the brackets can often be omitted, e.g., Y[3]=Y3. The only exception is SUMX[3], which do not always equal SUMX3. At the resolution described in this example, Section 2 contains four X bits to the left of (i.e., of higher bits) the by pass bits, and the Y bits that will participate in the additions with these four X bits. The "Y bits" that will participate in the additions with these four higher X bits are obtained by first fractoring the X-directional resolution into a series of powers of two, then substracting the highest power from the lower powers (i.e., all except the highest power), respectively. This is further explained below:

$$\text{X-directional resolution} = 1600 = 2^{10} + 2^9 + 2^6$$

The highest power (of 2) of the X-direction bits is 10. Therefore, the Y bits that will participate in the additions with the higher X bits are:

$$10-9=1=Y0$$

$$10-6=4=Y0, Y1, Y2, Y3$$

Therefore, as shown in Table 1b, Section 2 contains X6, X7, X8, X9, Y0, Y0, Y1, Y2, and Y3.

Now referring to FIG. 5, SUMX[2:0] are obtained as follows:

$$SUMX[0]=A[0]+B[0]$$

$$SUMX[1]=A[1]+B[1]+CO$$

$$SUMX[2]=A[2]+B[2]+CO1$$

$$SUMX[3]=X9+SUMX3$$

wherein:

$CO$=carrier bit from $A[0]+B[0]$ $CO1$=carrier bit from $A[1]+B[1]$ $CO2$=carrier bit from $A[2]+B[2]$ $COX$=carrier bit from $A[3]+B[3]$ $$SUMX3=A[3]+B[3]+COX$$

Relating Table 1b with FIG. 5, A[3:0] are the 0–3 bits in the third row (counting from the top) of Section 2, i.e., X6, X7, X8, and Y0; B[3:0] are the 0–3 bits in the fourth row of Section 2, i.e., Y0, Y1, Y2, and Y3. Accordingly, A[n] is the nth bit in the third row in Section 2, and B[m] is the mth bit in the fourth row in Section 2. For example A[0]=X6 and B[0]=Y0.

The operations in Sections 2 and 3 can be described according to the following possible scenarios:

Scenario 1: X10=1 and X9=1

In this scenario, X8=X7=X6=0 (otherwise the X bit will be greater than 1,600). Therefore:

$$CO=CO1=CO2=0;$$

$$A[0]=X6=A[1]=X7=A[2]=X8=0; \text{ and}$$

$$SUMX[3]=A[3]+B[3]+CO2+X9=A[3]+B[3]+1=SUMX3$$

The sum of Section 2 is SUMX[3:0].

In Section 3, first, as shown in FIG. 5, the Y bits in the third and fourth rows and COX are added to obtain SUMY, i.e.:

$$SUMY[9:0]=Y[10:1]+Y[10:4]+COX$$

And the highest bit of X, X10, will be treated as the carrier from SUMX[3], CIY, i.e.:

$CIY=X10$

The sum in Section 3 equals Y[10:0]+SUMY[9:0]+CIY
Scenario 2: X10=0 and X9=1

$SUMX3=A[3]+B[3]+CO2$ $SUMX[3]=SUMX3+X9$

The sum of Section 2 is SUMX[3:0]. The carrier from SUMX3, COX, is added to SUMY, and the carrier from SUMX[3] is designated as CIY.
In Section 3:

$SUMY[9:0]=Y[10:1]+Y[10:4]+COX$

The sum in Section 3 equals Y[10:0]+SUMY[9:0]+CIY
Scenario 3: X10=1 and X9=0

$SUMX3=A[3]+B[3]+CO2$ $SUMX[3]=SUMX3+X9=SUMX3$

The sum of Section 2 is SUMX[3:0]. The carrier COX from SUMX3 is added to SUMY, and X10 is used as CIY, i.e., CIY=X10=1. In Section 3, SUMY[9:0]=Y[10:1]+Y[10:4]+COX, and the sum in Section 3 equals Y[10:0]+SUMY[9:0]+CIY
Scenario 4: X10=0 and X9=0

$SUMX3=A[3]+B[3]+CO2$ $SUMX[3]=SUMX3+X9=SUMX3$

The sum of Section 2 is SUMX[3:0]. The carrier COX from SUMX3 is added to SUMY, and CIY=X10=0. In Section 3, SUMY[9:0]=Y[10:1]+Y[10:4]+COX, and the sum in Section 3 equals Y[10:0]+SUMY[9:0]+CIY From the above four scenarios, it can be concluded that when X10=0, {CIY, SUMX[3]} =X[9]+SUMX3. This indicates that whether CIY, the carrier from SUMX[3], is 1 or zero is determined by the carrier of x[9]+SUMX3, and SUMX[3] equals the sum of X[9]+SUMX3. On the other hand, when X10=1, {CIY, SUMX[3]}=(1, SUMX3}. This indicates that CIY=1, and SUMX[3]=SUMX3. The linear address Z=Section 1+Section 2+Section 3=(X[5:0])+(SUM[3:0])+(Y[10:0]+SUMY[9:0]+CIY).

EXAMPLE 2 (Video Display with 1280×1024 Resolution):

The process to convert the two-dimensional position (X, Y) of a pixel in a 1280×1024 screen to a linear address Z can be expressed as follows:

$$Z = Y \times 1280 + X$$
$$= Y \times (1024 + 256) + X$$
$$= Y \times (2^{10} + 2^8) + X$$

In the above expression, Y has a 10-bit address (i.e., Y=Y[9:0]), and X has also a 11-bit address (i.e., X=X[10:0]); Z is 20-bit (i.e., Z=Z[19:0]).

The conversion from (X, Y) to Z can be expressed in terms of binary addresses in Table 2a below:

TABLE 2a

|     |     |     |     |     |     |     |     |     |     | X10 | X9 | X8 | X7 | X6 | X5 | X4 | X3 | X2 | X1 | X0 |
|     | Y9  | Y8  | Y7  | Y6  | Y5  | Y4  | Y3  |     |     | Y2  | Y1 | Y0 |    |    |    |    |    |    |    |    |
| Y9  | Y8  | Y7  | Y6  | Y5  | Y4  | Y3  | Y2  | Y1  | Y0  |     |    |    |    |    |    |    |    |    |    |    |
| Z19 | Z18 | Z17 | Z16 | Z15 | Z14 | Z13 | Z12 | Z11 | Z10 | Z9  | Z8 | Z7 | Z6 | Z5 | Z4 | Z3 | Z2 | Z1 | Z0 |    |

Table 2a can be rearranged into three sections as shown in Table 2b to show the positions of the y-directional and x-directional input bits in FIGS. 5 and 6.

TABLE 2b

| Section 3 | | | | | | | | | | Section 2 | | | | | | | Section 1 | | | |
|---|---|---|---|---|---|---|---|---|---|---|---|---|---|---|---|---|---|---|---|---|
|     |     |     |     |     |     |     |     |     | X10 |     |    |    |    |    |    |    |    |    |    |    |
| Y9  | Y8  | Y7  | Y6  | Y5  | Y4  | Y3  | Y2  | Y1  | Y0  | X9  | X8 | X7 | X6 | X5 | X4 | X3 | X2 | X1 | X0 |    |
|     | Y9  | Y8  | Y7  | Y6  | Y5  | Y4  | Y3  | Y2  | Y1  | Y0  |    |    |    |    |    |    |    |    |    |    |
| Z19 | Z18 | Z17 | Z16 | Z15 | Z14 | Z13 | Z12 | Z11 | Z10 | Z9  | Z8 | Z7 | Z6 | Z5 | Z4 | Z3 | Z2 | Z1 | Z0 |    |

In Section 1, the by pass bits are X0, X1, X2, X3, X4 and X5. And the operations in Sections 2 and 3 are described below.
Scenario 1: X10=1, X9=X8=0
In this scenario, CO=CO1=CO2=0

$SUMX3=A[3]+B[3]+CO2=B[3]=SUMX[3]$

The sum of Section 2 equals SUMX[3:0]
CIY=X10=1, and the sum of Section 3 equals Y[9:0]+Y[9:2]+CIY
Scenario 2: X10–0, X9=1
In this scenario, SUMX3=A[3]+B[3]+CO2=SUMX[3]
The sum of Section equals SUMX[3:0]
CIY=COX, and the sum of Section 3 equals Y[9:0]+Y[9:2]+CIY
Scenario 3: X10=0, X9=A[3]=0
In this scenario, SUMX3=SUMX[3]=A[3]+B[3]+CO2=B[3]+CO2
The sum of Section 2 equals SUMX[3:0]=A[3]+B[3]+A[2:0]+B[2:0]=X9+Y1+X[8:6]+Y0
CIY=COX, and the sum of Section 3 equals Y[9:0]+Y[9:2]+CIY
Overall, the linear address Z=Section 1+Section 2+Section 3=(X[5:0])+(SUM[3:0])+(Y[9:0]+Y[9:2]+CIY).

EXAMPLE 3 (Video Display with 1152×900 Resolution):

The process to convert the two-dimensional position (X, Y) of a pixel in a 1152×900 screen to a linear address Z can be expressed as follows:

$$Z = Y \times 1152 + X$$
$$= Y \times (1024 + 128) + X$$
$$= Y \times (2^{10} + 2^7) + X$$

In the above expression, Y has a 10-bit address (i.e., Y=Y[9:0]), and X has also a 11-bit address (i.e., X=X[10:0]); Z is 20-bit (i.e., Z=Z[19:0]).

The conversion from (X, Y) to Z can be expressed in terms of binary addresses in Table 3a below:

TABLE 3a

|     |     |     |     |     |     |     |     |     |     | X10 | X9 | X8 | X7 | X6 | X5 | X4 | X3 | X2 | X1 | X0 |
|     |     |     | Y9  | Y8  | Y7  | Y6  | Y5  | Y4  | Y3  | Y2  | Y1 | Y0 |    |    |    |    |    |    |    |    |
| Y9  | Y8  | Y7  | Y6  | Y5  | Y4  | Y3  | Y2  | Y1  | Y0  |     |    |    |    |    |    |    |    |    |    |    |
| Z19 | Z18 | Z17 | Z16 | Z15 | Z14 | Z13 | Z12 | Z11 | Z10 | Z9  | Z8 | Z7 | Z6 | Z5 | Z4 | Z3 | Z2 | Z1 | Z0 |    |

Table 3a can be rearranged into three sections as shown in Table 3b to show the positions of the y-directional and x-directional input bits shown in FIGS. 5 and 6.

TABLE 3b

| Section 3 | | | | | | | | | | Section 2 | | | | | | | | Section 1 | | |
|---|---|---|---|---|---|---|---|---|---|---|---|---|---|---|---|---|---|---|---|---|
|     |     |     |     |     |     |     |     |     |     | X10 |    |    |    |    |    |    |    |    |    |    |
| Y9  | Y8  | Y7  | Y6  | Y5  | Y4  | Y3  | Y2  | Y1  | Y0  | X9  | X8 | X7 | X6 | X5 | X4 | X3 | X2 | X1 | X0 |    |
|     |     |     | Y9  | Y8  | Y7  | Y6  | Y5  | Y4  | Y3  | Y2  | Y1 | Y0 |    |    |    |    |    |    |    |    |
| Z19 | Z18 | Z17 | Z16 | Z15 | Z14 | Z13 | Z12 | Z11 | Z10 | Z9  | Z8 | Z7 | Z6 | Z5 | Z4 | Z3 | Z2 | Z1 | Z0 |    |

At this resolution, the by pass bits in Section 1 are X0, X1, X2, X3, X4, and X5=X[5:0]. In Section 2, SUMX3=A[3]+B[3]+CO2=SUMX[3]. If X10=0, then the carrier COX in SUMX3 is CIY. If X10=1, then CIY=X10=1. The sum in Section 2 equals SUMX[3:0]=SUMX[3]+A[2:0]+B[2:0]= X9+Y2+X[8:6]+Y[1:0]. The sum in Section 3 equals Y[9:0] +Y[9:3]+CIY. The linear is the sum of Section 3+Section 2+Section 1, which equals (Y[9:0]+Y[9:3]+CIY)+(SUMX [3:0])+(X[5:0]).

EXAMPLE 4 (Video Display with 800×600 Resolution)

The process to convert the two-dimensional position (X, Y) of a pixel in a 1152×900 screen to a linear address Z can be expressed as follows:

$$Z = Y \times 800 + X$$
$$= Y \times (512 + 256 + 32) + X$$
$$= Y \times (2^9 + 2^8 + 2^5) + X$$

In the above expression, Y has a 10-bit address (i.e., Y=Y[9:0]), and X has also a 11-bit address (i.e., X=X[10:0]); Z is 20-bit (i.e., Z=Z[19:0]).

The conversion from (X, Y) to Z can be expressed in terms of binary addresses in Table 4a below:

TABLE 4a

|     |     |     |     |     |     |     |     |     |     | X9  | X8 | X7 | X6 | X5 | X4 | X3 | X2 | X1 | X0 |
|     |     |     |     |     | Y9  | Y8  | Y7  | Y6  | Y5  | Y4  | Y3 | Y2 | Y1 | Y0 |    |    |    |    |    |
|     |     | Y9  | Y8  | Y7  | Y6  | Y5  | Y4  | Y3  | Y2  | Y1  | Y0 |    |    |    |    |    |    |    |    |
| Y9  | Y8  | Y7  | Y6  | Y5  | Y4  | Y3  | Y2  | Y1  | Y0  |     |    |    |    |    |    |    |    |    |    |
| Z18 | Z17 | Z16 | Z15 | Z14 | Z13 | Z12 | Z11 | Z10 | Z9  | Z8  | Z7 | Z6 | Z5 | Z4 | Z3 | Z2 | Z1 | Z0 |    |

Table 4a can be rearranged into three sections as shown in Table 4b to show the positions of the y-directional and x-directional input bits shown in FIGS. 5 and 6.

TABLE 4b

| | | | Section 3 | | | | | | | Section 2 | | | | Section 1 | | | |
|---|---|---|---|---|---|---|---|---|---|---|---|---|---|---|---|---|---|
| | | | | | | | | | X9 | | | | | | | | |
| Y9 | Y8 | Y7 | Y6 | Y5 | Y4 | Y3 | Y2 | Y1 | Y0 | X8 | | | X4 | X3 | X2 | X1 | X0 |
| | Y9 | Y8 | Y7 | Y6 | Y5 | Y4 | Y3 | Y2 | Y1 | Y0 | X7 | X6 | X5 | | | | |
| | | Y10 | Y9 | Y8 | Y7 | Y6 | | Y5 | Y4 | Y3 | Y2 | Y1 | Y0 | | | | |
| Z18 | Z17 | Z16 | Z15 | Z14 | Z13 | Z12 | Z11 | Z10 | Z9 | Z8 | Z7 | Z6 | Z5 | Z4 | Z3 | Z2 | Z1 | Z0 |

At this resolution, the by pass bits in Section 1 are X4, X3, X2, X1, and X0. The operation in Section 2 is similar to that in Example 1 (1600×1200), i.e., when X9=0, {CIY, SUMX[3]}={X8, SUMX3}; when X9=1, {CIY, SUMX[3]}={1, SUMX3}; and:

$$SUMX[2:0]=A[2:0]+B[2:0]$$

$$SUMX3=A[3]+B[3]+CO2$$

The carrier COX from SUMX3 is added to SUMY, and SUMX[3]=SUMX3+X8. The sum in Section 2 equals SUMX[3:0]. The Operation in Section 3 is also similar to that in Example 1, i.e., SUMY=Y[9:1]+Y[9:4]+COX. The sum in Section equals Y[9:0]+SUMY+CIY. The linear address at this resolution is the sum of Section 3+Section 2+Section 1, which equals (Y[9:0]+SUMY+CIY)+(SUMX[3:0])+(X[4:0]).

EXAMPLE 5 (Video Display with 640×480 Resolution):

The process to convert the two-dimensional position (X, Y) of a pixel in a 640×480 screen to a linear address Z can be expressed as follows:

$$\begin{aligned} Z &= Y \times 640 + X \\ &= Y \times (512 + 128) + X \\ &= Y \times (2^9 + 2^7) + X \end{aligned}$$

In the above expression, Y has a 9-bit address (i.e., Y=Y[8:0]), and X has also a 10-bit address (i.e., X=X[9:0]); Z is 18-bit (i.e., Z=Z[17:0]).

The conversion from (X, Y) to Z can be expressed in terms of binary addresses in Table 5a below:

TABLE 5a

| | | | | | | | | X9 | X8 | X7 | X6 | X5 | X4 | X3 | X2 | X1 | X0 |
|---|---|---|---|---|---|---|---|---|---|---|---|---|---|---|---|---|---|
| | Y8 | Y7 | Y6 | Y5 | Y4 | Y3 | Y2 | Y1 | Y0 | | | | | | | | |
| Y8 | Y7 | Y6 | Y5 | Y4 | Y3 | Y2 | Y1 | Y0 | | | | | | | | | |
| Z17 | Z16 | Z15 | Z14 | Z13 | Z12 | Z11 | Z10 | Z9 | Z8 | Z7 | Z6 | Z5 | Z4 | Z3 | Z2 | Z1 | Z0 |

Table 5a can be rearranged into three sections as shown in Table 5b to show the positions of the y-directional and x-directional input bits shown in FIGS. 5 and 6.

TABLE 5b

| | | | Section 3 | | | | | | Section 2 | | | | | Section 1 | | | |
|---|---|---|---|---|---|---|---|---|---|---|---|---|---|---|---|---|---|
| | | | | | | | | X9 | | | | | | | | | |
| Y8 | Y7 | Y6 | Y5 | Y4 | Y3 | Y2 | Y1 | Y0 | X8 | X7 | X6 | X5 | X4 | X3 | X2 | X1 | X0 |
| | Y8 | Y7 | Y6 | Y5 | Y4 | Y3 | Y2 | Y1 | Y0 | | | | | | | | |
| Z17 | Z16 | Z15 | Z14 | Z13 | Z12 | Z11 | Z10 | Z9 | Z8 | Z7 | Z6 | Z5 | Z4 | Z3 | Z2 | Z1 | Z0 |

At this resolution, the by pass bits in Section 1 are X4, X3, X2, X1, and X0. The operation in Section 2 is similar to Example 2, such that SUMX[2:0]=A[2:0]+B[2:0], and the carrier from SUMX[3] is COX. When X9=0, {CIY, SUMX[3]}={COX, SUMX3}; and when X9=1, {CIY, SUMX[3]}={1, SUMX3}, and SUMX[3]=SUMX3=A[3]+B[3]+CO2. Therefore, the sum in Section 2 equals SUMX[3:0]= SUMX3+A[2:0]+B[2:0]. The operation in Section 3 is also similar to Example 2. The sum of Section 3 equals Y[8:0]+Y[8:2]+CIY, and the linear address, which equals Section 3+Section 2+Section 1, equals (Y[8:0]+Y[8:2]+CIY)+(SUMX[3:0])+(X[4:0]).

EXAMPLE 6 (Video Display with 1024×768 Resolution):

The process to convert the two-dimensional position (X, Y) of a pixel in a 1024×768 screen to a linear address Z can be expressed as follows:

$$\begin{aligned} Z &= Y \times 1024\, X \\ &= Y \times (2^{10}) + X \end{aligned}$$

In the above expression, Y has a 10-bit address (i.e., Y=Y[9:0]), and X has also a 10-bit address (i.e., X=X[9:0]); Z is 20-bit (i.e., Z=Z[19:0]).

The conversion from (X, Y) to Z can be expressed in terms of binary addresses in Table 6a below:

TABLE 6a

| Y9 | Y8 | Y7 | Y6 | Y5 | Y4 | Y3 | Y2 | Y1 | Y0 | X9 | X8 | X7 | X6 | X5 | X4 | X3 | X2 | X1 | X0 |
|----|----|----|----|----|----|----|----|----|----|----|----|----|----|----|----|----|----|----|----|
| Z19 | Z18 | Z17 | Z16 | Z15 | Z14 | Z13 | Z12 | Z11 | Z10 | Z9 | Z8 | Z7 | Z6 | Z5 | Z4 | Z3 | Z2 | Z1 | Z0 |

Table 6a can be rearranged into three sections as shown in Table 6b to show the positions of the y-directional and x-directional input bits shown in FIGS. 5 and 6.

TABLE 6b

| Section 3 | | | | | | | | | | Section 2 | | | | | | | | Section 1 | |
|----|----|----|----|----|----|----|----|----|----|----|----|----|----|----|----|----|----|----|----|
| Y9 | Y8 | Y7 | Y6 | Y5 | Y4 | Y3 | Y2 | Y1 | Y0 | X9 | X8 | X7 | X6 | X5 | X4 | X3 | X2 | X1 | X0 |
| Z19 | Z18 | Z17 | Z16 | Z15 | Z14 | Z13 | Z12 | Z11 | Z10 | Z9 | Z8 | Z7 | Z6 | Z5 | Z4 | Z3 | Z2 | Z1 | Z0 |

At this resolution, the by pass bits in Section 1 are X5, X4, X3, X2, X1, and X0, or X[5:0]. The sum of Section 2 equals A[3]+B[3]+A[2:0]+B[2:0]=X9+0+X[8:6]+0. And the sum in Section 3 equals SUMY=Y[9:0]. The linear address, which equals Section 3+Section 2+Section 1, equals (Y[9:0])+(X9+X[8:6])+(X[5:0]).

The operations for the above listed resolutions can be summarized below:

(1) 1600X1280:
$$Z = \text{Section 1} + \text{Section 2} + \text{Section 3}$$
$$= (X[5^0]) + (SUMX[3] + SUMX[2^0]) + (Y[10^0] + SUMY + CIY)$$
$$= (X[5^0]) + (A[3] + B[3] + A[2^0] + B[2^0]) + (Y[10^0] + Y[10^1] + Y[10^4] + CIY)$$
$$= (X[5^0]) + (Y0 + Y3 + X9 + X[8^6] + Y[2^0]) + (Y[10^0] + Y[10^1] + Y[10^4] + COX + CIY)$$

(2) 1280X1024:
$$Z = \text{Section 1} + \text{Section 2} + \text{Section 3}$$
$$= (X[5^0]) + (SUMX[3] + SUMX[2^0]) + (Y[9^0] + SUMY + CIY)$$
$$= (X[5^0]) + (A[3] + B[3] + A[2^0] + B[2^0]) + (Y[9^0] + Y[9^2] + CIY)$$
$$= (X[5^0]) + (X9 + Y1 + X[8^6] + Y0) + (Y[9^0] + Y[9^2] + CIY)$$

(3) 1152X900:
$$Z = \text{Section 1} + \text{Section 2} + \text{Section 3}$$
$$= (X[5^0]) + (SUMX[3] + SUMX[2^0]) + (Y[9^0] + SUMY + CIY)$$
$$= (X[5^0]) + (A[3] + B[3] + A[2^0] + B[2^0]) + (Y[9^0] + Y[9^3] + CIY)$$
$$= (X[5^0]) + (X9 + Y2 + X[8^6] + Y[1^0]) + (Y[9^0] + Y[9^3] + CIY)$$

(4) 800X600:
$$Z = \text{Section 1} + \text{Section 2} + \text{Section 3}$$
$$= (X[4^0]) + (SUMX[3] + SUMX[2^0]) + (Y[9^0] + SUMY + CIY)$$
$$= (X[4^0]) + (A[3] + B[3] + X8 + A[2^0] + B[2^0]) + (Y[9^0] + Y[9^1] + Y[9^4] + COX + CIY)$$
$$= (X[4^0]) + (Y0 + Y31 + X[7.5] + X8 + Y[2^0]) + (Y[9^0] + Y[9^1] + Y[9^4] + COX + CIY)$$

(5) 640X480:
$$Z = \text{Section 1} + \text{Section 2} + \text{Section 3}$$
$$= (X[4^0]) + (SUMX[3] + SUMX[2^0]) + (Y[8^0] + SUMY + CIY)$$
$$= (X[4^0]) + (A[3] + B[3] + A[2^0] + B[2^0]) + (Y[8^0] + Y[8^2] + CIY)$$
$$= (X[4^0]) + (X8 + Y1 + X[7^5] + 0) + (Y[8^0] + Y[8^2] + CIY)$$

(6) 1024X768:
$$Z = \text{Section 1} + \text{Section 2} + \text{Section 3}$$
$$= (X[5^0]) + (SUMX[3] + SUMX[2^0]) + (0 + SUMY + CIY)$$
$$= (X[5^0]) + (A[3] + B[3] + A[2^0] + B[2^0]) + (0 + Y[9^0] + CIY)$$
$$= (X[5^0]) + (X9 + 0 + X[8^6] + 0) + (0 + Y[9^0] + CIY)$$

The apparatus disclosed in the present invention, as illustrated in FIGS. 4 and 5, provides the desired conversions for the above listed operations. Because the apparatus disclosed in the present invention does not require a CPU to carry out the conversion, it is much faster than the conventional devices, which depend on the clock rate of the system CPU. A test sample manufactured using a 1 μm IC process was timed to take 13.5 ns to perform a conversion. The test sample requires a gate count of about 387; therefore, it can be inexpensively manufactured. Another advantage of the present invention is that it can be used with all the six most popular high-resolution displays in the market.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A converter apparatus for use with a computer display screen to convert coordinates of two-dimensional pixels of a graphic image to linear address, each of said pixels being represented by a first coordinate and a second coordinate, said first coordinate having an X-bit address and said second coordinate having a Y-bit address, said X bits consisting of lower X bits and higher X bits, and said Y bits consisting of lower Y bits and higher Y bits, each of said linear addresses having Z bits consisting of lower Z bits, middle Z bits, and higher Z bits, said converter apparatus comprising:

(a) a first circuit to receive said lower X bits of various resolutions as inputs, and to output said lower Z bits;

(b) a second circuit to receive said higher X bits and said lower Y bits as inputs, also of various resolutions, and to output said middle Z bits and a first carrier bit;

(c) a third circuit to receive said upper Y bits and a portion of said lower Y bits, also of various resolutions, and null bits as inputs, and to output precursory higher Z bits;

(d) a first adder circuit to receive said precursory Z bits, said Y bits and said first carrier bit as inputs, and to output said higher Z bits; and (e) a second adder circuit to receive said lower Z bits, said middle Z bits and said higher Z bits as inputs, and to output said Z-bit linear address;

(f) wherein said first circuit, said second circuit, and said third circuit all being connected to a resolution select to select one of said inputs respectively connected thereto;

(g) said second circuit comprises a second multiplexer, a third. multiplexer, a fourth multiplexer, a third adder circuit, and a logical operation circuit;

(h) said third adder circuit being adapted to receive outputs from said second, third, and fourth multiplexers as inputs, and to output said middle Z bits minus the highest middle Z bit, a special Z bit corresponding said highest middle Z bit, and a second carrier bit; and (i) said logical operation circuit being adapted to receive said special Z bit, said second carrier bit, and a portion of said higher X bits as inputs, and to output said first carrier bit and said highest middles Z bits.

2. The converter apparatus of claim 1 wherein said first circuit comprises a first multiplexer.

3. The converter apparatus of claim 1 wherein said third adder circuit comprises an AND gate, an OR gate, and a plurality of full adders.

4. The converter apparatus of claim 3 which further comprises an exclusive OR gate.

5. The converter apparatus of claim 3 wherein said logical circuit comprises a plurality of half adders and a plurality of multiplexers.

6. The converter apparatus of claim 1 wherein said third circuit comprises a fifth multiplexer.

7. The converter apparatus of claim 1 which is adapted to work with video displays having resolutions of 1280×1024, 1152×900, 640×480, 1024×768, 1600×1280, or 800×600.

8. The converter apparatus of claim 1 which is adapted to work with video displays having resolutions of 1280×1024, 1152×900, 640×480, or 1024×768.

9. A converter apparatus for use with a computer display screen to convert coordinates of two-dimensional pixels of a graphic image to linear address, each of said pixels being represented by a first coordinate and a second coordinate, said first coordinate having an X-bit address and said second coordinate having a Y-bit address, said X bits consisting of lower X bits and higher X bits, and said Y bits consisting of lower Y bits and higher Y bits, each of said linear addresses having Z bits consisting of lower Z bits, middle Z bits, and higher Z bits, said convertor apparatus comprising:

(a) a first circuit to receive said lower X bits of various resolutions as inputs, and to output said lower Z bits;

(b) a second circuit to receive said higher X bits and said lower Y bits as inputs, also of various resolutions, and to output said middle Z bits and a first carrier bit;

(c) a third circuit to receive said upper Y bits and a portion of said lower Y bits, also of various resolutions, and null bits as inputs, and to output precursory higher Z bits;

(d) a first adder circuit to receive said precursory Z bits, said Y bits and said first carrier bit as inputs, and to output said higher Z bits; and (e) a second adder circuit to receive said lower Z bits, said middle Z bit and said higher Z bits as inputs, and to output said Z-bit linear address;

(f) wherein said first circuit, said second circuit, and said third circuit all being connected to a resolution select to select one of said inputs respectively connected thereto;

(g) said converter further comprises a fourth adder circuit, said fourth adder circuit being adapted to receive said lower Y bits, said second carrier bit, and said Y bits minus the lowest Y bit as inputs, and to output special (Y-1) bits to said third circuit, said special (Y-1) bits corresponding to said Y bits minus the lowest Y bit; and said third circuit is further adapted to receive said special (Y-1) bits.

10. The converter apparatus of claim 9 which is adapted to work with video displays having resolutions of 1280× 1024, 1152×900, 640×480, 1024×768, 1600×1280, or 800× 600.

* * * * *